(12) United States Patent
Neumann et al.

(10) Patent No.: US 10,807,741 B2
(45) Date of Patent: Oct. 20, 2020

(54) INTERNAL WIRE-TRIGGERED PULSED CATHODIC ARC PROPULSION SYSTEM

(71) Applicant: Neumann Space Pty Ltd, Adelaide SA (AU)

(72) Inventors: Patrick Neumann, Auburn (AU); Marcela Bilek, Sutherland (AU); David McKenzie, Artarmon (AU)

(73) Assignee: Neumann Space Pty Ltd, Adelaide SA (AU)

( * ) Notice: Subject to any disclaimer, the term of this patent is extended or adjusted under 35 U.S.C. 154(b) by 139 days.

(21) Appl. No.: 15/758,635

(22) PCT Filed: Sep. 9, 2016

(86) PCT No.: PCT/AU2016/050846
§ 371 (c)(1),
(2) Date: Mar. 8, 2018

(87) PCT Pub. No.: WO2017/045020
PCT Pub. Date: Mar. 23, 2017

(65) Prior Publication Data
US 2018/0244406 A1    Aug. 30, 2018

(30) Foreign Application Priority Data

Sep. 15, 2015   (AU) ................................ 2015903748

(51) Int. Cl.
*B64G 1/40*     (2006.01)
*F03H 1/00*     (2006.01)

(52) U.S. Cl.
CPC .......... *B64G 1/405* (2013.01); *F03H 1/0006* (2013.01); *F03H 1/0012* (2013.01); *F03H 1/0087* (2013.01)

(58) Field of Classification Search
CPC . F03H 1/00–0093; B64G 1/405; B64G 1/406; H01J 37/32055
See application file for complete search history.

(56) References Cited

U.S. PATENT DOCUMENTS 5,441,617 A * 8/1995 Chan ..................... C23C 14/325
                                                    204/192.38
5,879,518 A * 3/1999 Kuehnle ................ B01J 19/088
                                                    204/164

(Continued)

FOREIGN PATENT DOCUMENTS

| CN | 102297105 A | 12/2011 |
|----|-------------|---------|
| CN | 102305200 A | 1/2012 |
| CN | 102777342 A | 11/2012 |

OTHER PUBLICATIONS

Oates "A high-current pulsed cathodic vacuum arc plasma source" (Year: 2003).*

(Continued)

*Primary Examiner* — Scott J Walthour
*Assistant Examiner* — William L Breazeal
(74) *Attorney, Agent, or Firm* — Blank Rome LLP

(57) ABSTRACT

Disclosed herein is a propulsion system comprising: a solid conductive or semiconductive cathode (130); an anode (110) having a potential difference relative to said cathode (130), said potential difference creating an electric field between said anode (110) and said cathode (130); and an insulated trigger (150) adapted to trigger an arc discharge from a point on a upper surface of said cathode (130) in pulses, when said trigger (150) and cathode (130) are substantially in a vacuum, said trigger being bounded within the cathode so that the point at which the arc is triggered is located on the upper surface of said cathode.

25 Claims, 16 Drawing Sheets

(56) References Cited

U.S. PATENT DOCUMENTS

| | | |
|---|---|---|
| 6,373,023 B1 | 4/2002 | Hoskins et al. |
| 7,557,511 B2 | 7/2009 | Strikovski et al. |
| 2016/0273524 A1* | 9/2016 | Keidar .................. B64G 1/406 |

OTHER PUBLICATIONS

Nuemann "A pulsed cathodic arc spacecraft propulsion system" 2009 (Year: 2009).*

Aheieva "Vacuum Arc Thruster development and testing for micro- and nanosatellites" (Year: 2015).*

Chinese-language Office Action for CN Application No. 201680053649.7, dated May 8, 2019, 11 pgs.

European Search Opinion for EP Application No. EP16845382.7, dated Apr. 3, 2019, 4 pgs.

Supplementary European Search Report for EP Application No. EP16845382, dated Mar. 27, 2019, 3 pgs.

P.R.C. Neumann, et al., "A Pulsed Cathodic Arc Spacecraft Propulsion System", IOP Publishing, Plasma Sources Science and Technology, vol. 18, 2009, 8 pgs.

W.C. Lang, et al., "Study on Cathode Spot Motion and Macroparticles Reduction in Axisymmetric Magnetic Field-Enhanced Vacuum Arc Deposition", Science Direct, www.elsevier.com/locate/vacuum; vol. 84, 2010, pp. 1111-1117.

M. Keidar et al., "Magnetically Enhanced Vacuum Arc Thruster", Institute of Physics Publishing, Plasma Sources Science and Technology, vol. 14, 2005, pp. 661-669.

P.R.C. Nuemann, "Centre-Triggered Pulsed Cathodic Arc Spacecraft Propulsion Systems", https://ses.library.usyd.edu.au/handle/2123/13810; 2015, 187 pages.

Russian-language and English Translation of Office Action for 2018111939/11 (018498), dated Mar. 10, 2020, 11 pgs.

V. P. Glushko et al., Cosmonautics: Encyclopedia.—M: Soviet Encyclopedia, 1985, pp. 188-189.

* cited by examiner

US 10,807,741 B2

INTERNAL WIRE-TRIGGERED PULSED CATHODIC ARC PROPULSION SYSTEM

RELATED APPLICATIONS

This application is a national phase of PCT/AU2016/050846, filed on Sep. 9, 2016, which claims the benefit of Australian Application No. 2015903748, filed on Sep. 15, 2015. The entire contents of those applications are hereby incorporated by reference.

RELATED APPLICATION

The present application is related to Australian Provisional Patent Application No. 2015903748, titled "Internal wire-triggered pulsed cathodic arc propulsion system" and filed on 15 Sep. 2015 in the name of Neumann Space Pty Ltd, the entire content of which is incorporated by reference as if fully set forth herein.

TECHNICAL FIELD

The present disclosure relates to a pulsed cathodic arc propulsion system. In particular, the present invention relates to a pulsed cathodic arc propulsion system suitable for use in a spacecraft, wherein the arc is triggered by an insulated wire or pin surrounded by the material constituting the cathode.

BACKGROUND

A spacecraft is a machine or vehicle that is designed to operate in space. Such spacecraft include, but are not limited to, rockets, space shuttles, satellites, and space stations. Spacecraft are used for a variety of purposes, including communications, navigation, scientific research and discovery, meteorology, and the like. Space is a near vacuum environment, which presents difficulties in operating, maintaining, and fuelling spacecraft. These difficulties are magnified by the large distances involved and the consequential costs and timings to perform those operations.

Engines used for orbital station-keeping and long-duration spaceflight engines have been implemented using electric and plasma based propulsion systems. These propulsion systems have a high specific impulse, are controllable, and are technically mature and thus reliable. Further, electric and plasma based propulsion systems have a favourable deliverable mass fraction, which is the proportion of the initial mass of a spacecraft that can be delivered to the intended destination of that spacecraft.

A rocket propelled vehicle generates acceleration by discharging propellant at high velocity, resulting in an exchange of momentum due to an unbalanced force. The thrust generated by a propulsion system is the product of the exhaust velocity and the instantaneous rate of change of the mass of the spacecraft due to propellant expulsion. The thrust can be considered as an external force applied to the spacecraft.

Space missions that require the delivery of large payloads must use a prohibitively large propellant mass or the propulsion system must be multi-stage or the propulsion system exhaust velocity must be of the same order or greater than the required change in velocity. Since interplanetary missions typically require velocity changes of tens of kilometres per second, it follows that the exhaust velocity of any thruster employed on such a mission must be comparable to this required change in velocity and sufficiently robust to operate for extended periods. In such a context, electrical propulsion technologies are deemed to be preferable to chemical fuelled rockets, due to the high propellant exhaust velocities and fewer mechanical parts.

One problem that arises with electrical propulsion systems, relative to chemical propulsion systems, is the need to have a power supply. While chemical thrusters carry the energy needed to effect momentum changes inside the chemical bonds of the fuel, electrical propulsion systems need to have an energy source supplied to the system. Since any power supply used for propulsion adds mass and volume, it is necessary to make the electrical propulsion system as energy efficient as possible.

Determining the ratio of jet power to power consumed allows for a simple determination of energy efficiency in a working rocket, with flight rated systems achieving energy efficiency values of approximately 50 to 80%. This ratio is also termed "thrust efficiency," as it is the ratio of exhaust kinetic energy to available energy (in chemical thrusters) or input power (for electrical propulsion systems).

All of the gas fuelled electrical propulsion technologies suffer from the same design challenges, namely the added mass from propellant tanks and piping and the mechanical failure modes inherent in valves and pressure regulators.

There are disadvantages to all of the existing thruster systems that use a gaseous fuel. The pressurised tank, piping, valves and pressure regulator systems add mass to the spacecraft that could be given over to payload, as well as introducing manufacturing challenges and failure modes. These drawbacks could be overcome or substantially ameliorated if a reliable and efficient solid fuelled electromagnetic thruster was provided.

Pulsed Plasma Thrusters (PPTs) utilise a solid fuel and are reliable, but have problems with propellant feedstock evaporation between plasma pulses. PPTs ablate and ionise a proportion of the propellant feedstock by creating an arc discharge sheet across the face of a propellant cylinder using a discharging capacitor. The plasma that is created responds to the electric field of the arc and its own self-induced magnetic field, causing the plasma to accelerate down a discharge chamber or nozzle, resulting in moderate thrust. The propellant feedstock is generally a rod of solid material, such as polytetrafluoroethylene (PTFE), marketed as Teflon by E. I. du Pont de Nemours and Company ("DuPont"). The propellants used by PPTs typically have low melting points compared to most metals. Heat generated during arcing causes evaporation of the propellant between arc pulses, which expends fuel with only marginal thrust having been produced. Consequently, PPTs have much lower system efficiencies when compared to other technologies, as well as lower total thrust.

Thus, a need exists to provide an improved propulsion system suitable for use in a spacecraft.

SUMMARY

The present disclosure relates to an internal wire-triggered pulsed cathodic arc propulsion system suitable for use in a spacecraft.

In a first aspect, the present disclosure provides a propulsion system comprising:
  a solid conductive or semiconductive cathode;
  an anode having a potential difference relative to said cathode, said potential difference creating an electric field between said anode and said cathode; and
  an insulated trigger adapted to trigger an arc discharge from a point on an upper surface of said cathode in pulses, when said trigger and cathode are substantially in a vacuum, said trigger being bounded within the cathode so that the point at which the arc is triggered is located on the upper surface of said cathode.

In a second aspect, the present disclosure provides a spacecraft propulsion system comprising the above-mentioned propulsion system.

In a third aspect, the present disclosure provides a spacecraft comprising the above-mentioned spacecraft propulsion system.

According to another aspect, the present disclosure provides an apparatus for implementing any one of the aforementioned methods.

According to another aspect, the present disclosure provides a computer program product including a computer readable medium having recorded thereon a computer program for implementing any one of the methods described above.

Other aspects of the present disclosure are also provided.

BRIEF DESCRIPTION OF THE DRAWINGS

One or more embodiments of the present disclosure will now be described by way of specific example(s) with reference to the accompanying drawings, in which:

FIG. 4b is an alternative arrangement of the propulsion system of FIG. 4a;

DETAILED DESCRIPTION

Figure 1:
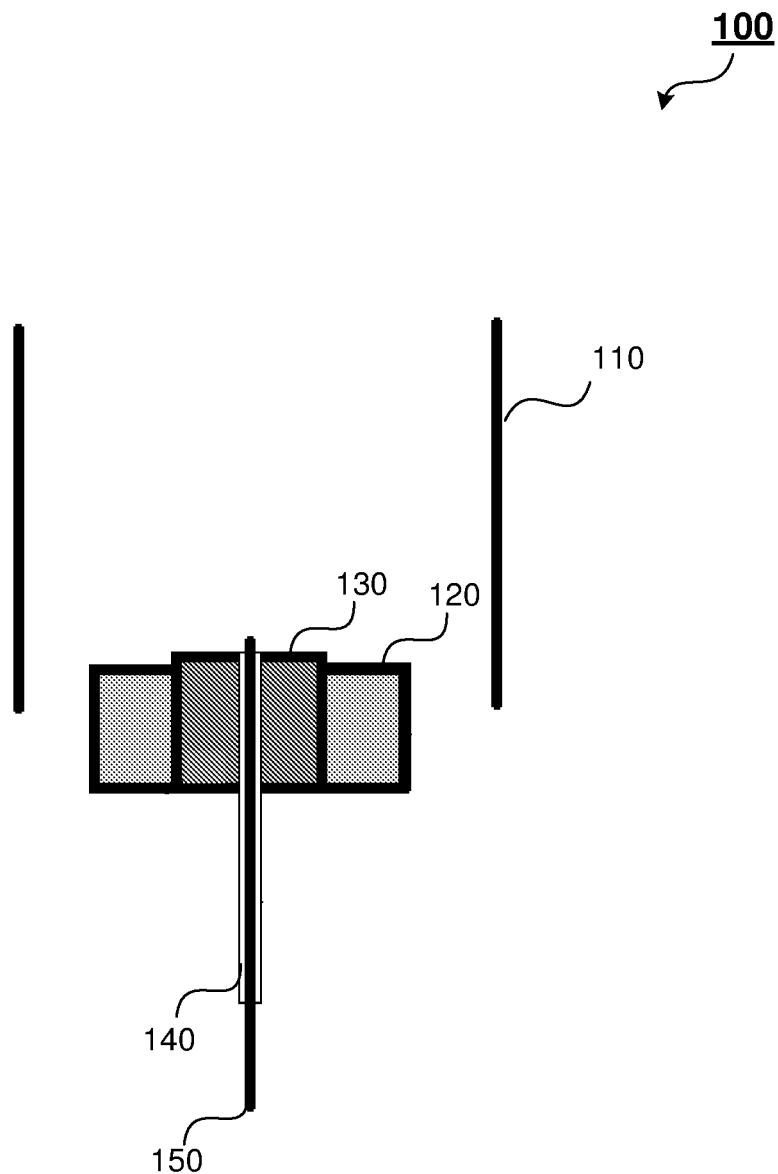
FIG. 1 is a schematic representation of an internal wire-triggered pulsed cathodic arc propulsion system.

Method steps or features in the accompanying drawings that have the same reference numerals are to be considered to have the same function(s) or operation(s), unless the contrary intention is expressed or implied.

The present disclosure provides a pulsed cathodic arc (PCA) propulsion system suitable for use in spacecraft and related applications. Such use may include, for example, application as a thruster for accelerating a spacecraft. A PCA system uses an arc discharge to generate plasma, wherein the plasma flows in part along electric field lines in order to complete a circuit. The plasma consists of ions, electrons and neutral vapour. The PCA system operates in a vacuum or near vacuum environment, such as space, and uses pulses of very short duration, in the range of 20 µs to 500 µs.

The PCA propulsion system of the present disclosure uses a conductive or semiconductive solid fuel in the form of a solid cathode. A trigger applies a short duration, high current surface flashover across an insulating barrier between a trigger pin or wire and an upper surface of the cathode. The flashover generates cathode spots on the upper surface of the cathode, leading to the creation of plasma. The production of plasma is maintained by a potential difference between the cathode and an anode, and the cathode spots move across the upper surface of the cathode, ejecting ionised material at high velocity in a narrow cone shape directed normal to the cathode surface.

The use of a solid fuel obviates the need for tanks, pipes, valves, or regulators, which are drawbacks of gas fuelled electrical propulsion technologies. Embodiments of the PCA propulsion system use a solid cathode made from a suitable conductive or semiconductive material. Suitable materials will depend on the particular application, but may include, for example, magnesium, titanium, aluminium, calcium, carbon, vanadium, molybdenum, tungsten, tantalum, tin, bismuth, chromium, iron, nickel and alloys or composites thereof. In addition to their conductive or semiconductive nature allowing arc triggering and current flow, such cathode materials typically have a much higher melting point than PTFE, overcoming the efficiency problems exhibited by PPTs, such as evaporation of the propellant feedstock between plasma pulses.

Triggering methods include laser, mechanical, and electrical triggering methods. Laser triggers ablate and ionise a small amount of cathode material to create a conducting path between the cathode and the anode, which can carry the current needed to sustain the arc. An advantage of laser triggering methods is that the laser can be used to start the arc at an arbitrary point located on the cathode surface. However, the laser aperture must have a line of sight to the cathode surface. Over time, there will be deposition of cathode material on the laser aperture, eventually rendering the laser aperture opaque. It is therefore necessary to either clean the aperture, or sacrifice some laser power by using mirrors to reflect the laser beam onto the cathode surface.

A mechanical trigger uses a length of conducting material for this purpose. In one arrangement, a mechanical trigger uses a wire connected to the anode and moves the wire to touch a surface of the cathode. The mechanical trigger is then withdrawn from the surface of the cathode, creating an arc between the end of the wire and the surface of the cathode. Mechanical methods use a sharp conductive element, which is moved to touch the cathode. As for the laser triggering method, mechanical triggering methods can trigger an arc at any point on the surface of the cathode. However, mechanical triggering systems require the use of moving mechanical components, which will wear out and/or be coated with deposited cathode material, leading to system failure over time.

Electrical triggers utilise a short duration, high current surface flash-over across an insulating barrier between a trigger-wire and the face of the cathode. The trigger-wire and insulating spacer can be located anywhere on the face of the cathode.

Electrical triggering methods use a pulse of high voltage, typically in the kilovolt range, over distances of millimetres to create electrical breakdown conditions over the face of an insulating material. These arcs create the intense electric fields necessary for the creation of cathode spots, leading to the creation of plasma. Plasma production is maintained by the potential difference between cathode and anode. The cathode spots move along the cathode surface, ejecting ionised material at high velocity in a cone directed normal to the cathode surface. Advantages of electrical triggering methods include the lack of moving parts and robustness. Further, electrical triggering methods have a repetition rate limited only by the power supply used to drive the trigger.

In an internal wire-triggered electrical triggering system, the trigger may be implemented using a wire made of tungsten, or some other refractory metal, sheathed in an insulating tube, said tube being made of an acceptably temperature and vacuum stable non-conductive material such as alumina, boron nitride, PTFE, or tempered glass, with an end of the trigger wire locally protruding above an upper surface of the cathode, typically but not necessarily at the centre of the cathode, so that the trigger wire and insulating tube are contained within the bulk of the cathode. In contrast, edge-triggering systems use an annular (ring-shaped) trigger surrounding or offset from an annular insulator that separates the cylindrical or tubular cathode from the annular trigger. The trigger element, whether a pin, wire or ring, is rapidly charged and an electric field strong enough to cause breakdown across the surface of the insulator between the trigger and cathode is created. Dense electrical arcs travel down these breakdown paths to the cathode, causing localised plasma generation to occur. The plasma generation sites are known as "cathode spots", and cathode spots in an internal wire-triggered arc are free to traverse the upper surface of the cathode. The plasma initiates a high current discharge on the cathode surface, which is driven by a low impedance power supply capable of delivering currents ranging from tens to thousands of amperes for short periods of time. The trigger pulse is commonly only a few microseconds long and is of low current, as the trigger pulse only exists to close the "switch" needed to fire the arc by creating a low impedance pathway from cathode to anode.

FIG. 1 is a schematic representation of an internal wire-triggered pulsed cathodic arc propulsion system 100 adapted to generate a plasma discharge when operated in a vacuum. The system 100 includes an anode 110 and a cathode 130. The cathode 130 is held in position by a cathode mount 120. The cathode 130 is a solid cathode made from magnesium, titanium, aluminium, calcium, carbon, vanadium, molybdenum, tungsten, tantalum, tin, bismuth, chromium, or an alloy or composite thereof. In this example, the solid cathode 130 is made from magnesium, and the trigger pin/wire is coaxial with the cylindrical anode, with a short protruding length centrally located in the outer face of the cathode as a "centre-triggered" arc.

The system 100 also includes a trigger for triggering an arc on an upper surface of the cathode 130, so as to generate cathode spots and thus lead to the generation of a plasma discharge. Electrical triggering methods use a pulse of high voltage, typically in the kilovolt range, over distances of millimetres to create electrical breakdown conditions over the face of an insulating material. In this example, the trigger is an electrical centre-trigger with an elongated trigger pin 150 positioned through the middle of the cathode 130. A trigger insulator 140 is positioned between the trigger pin 150 and the cathode 130.

In operation, a charging voltage in the range of approximately 50V to 500V is applied between the anode 110 and the cathode 130, which establishes an electric field therebetween. A high voltage trigger signal is applied to the trigger pin 150, which creates electrical breakdown conditions over the face of the trigger insulator 140 and generates cathode spots on an upper surface of the cathode 130. The trigger signal is in the kilovolt range, from approximately 1 kV to 20 kV. In one example, the trigger signal is 1.2 kV.

Material ejected from the cathode spots forms a dense plasma. A "running" or "burning" voltage of approximately 30V to 100V is maintained between the anode 110 and the cathode 130 while the plasma arc is in operation. In the internal wire-triggered system 100 of FIG. 1, the cathode spots travel radially outwards from the trigger site, following a dendritic pattern, that is, a semi-random movement or motion with branches that resemble tree branches as those branches radiate from a central position or trunk. This radial motion is driven by repulsion arising from the phenomenon of retrograde J×B motion.

Figure 2A:
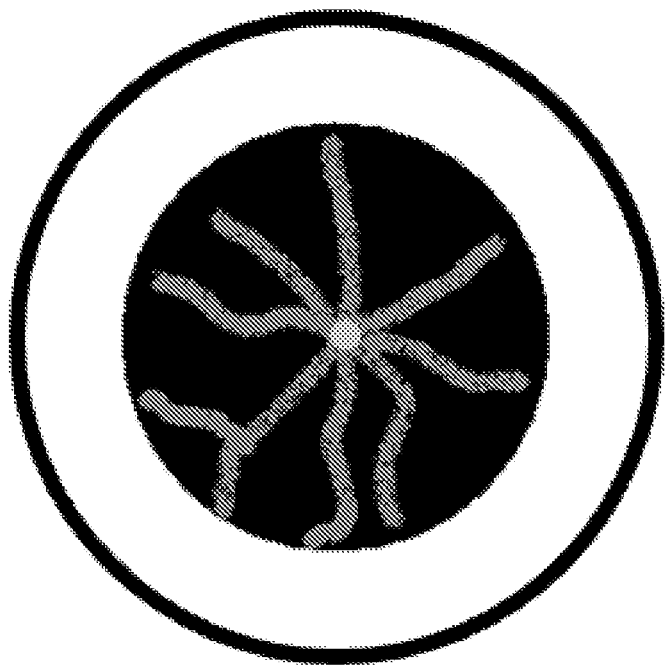
FIGS. 2a and 2b illustrate cathode spot migration and cathode erosion profiles for an internal wire-triggered cathodic arc propulsion system.
Figure 2B:
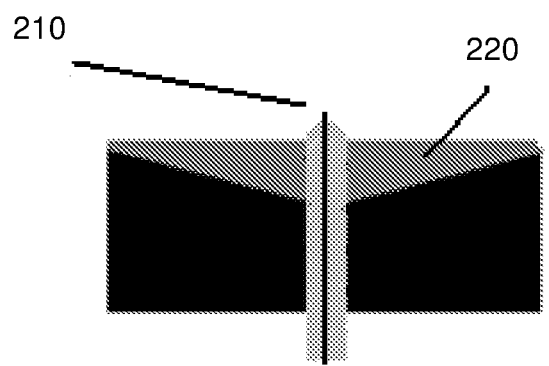
Figure 3A:
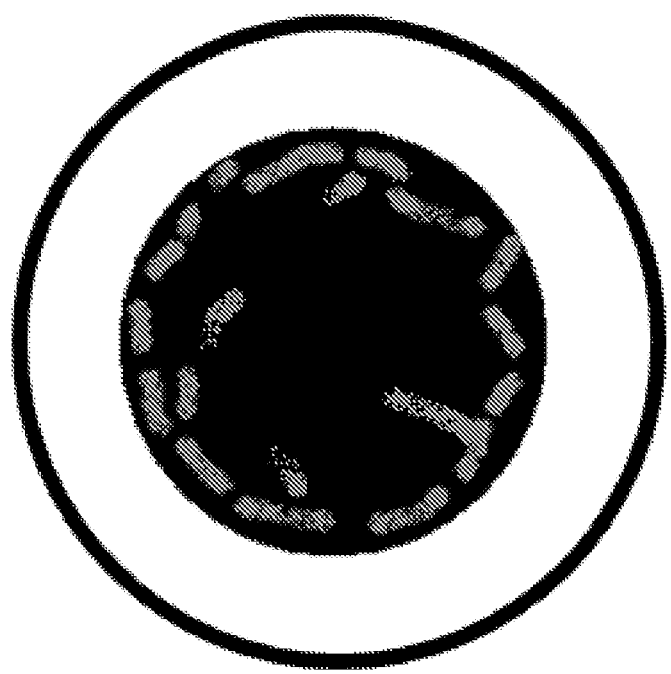
FIGS. 3a and 3b illustrate cathode spot migration and cathode erosion profiles for an external edge-triggered cathodic arc propulsion system.
Figure 3B:

The repulsion of cathode spots is opposite to the expected attraction of two parallel currents. A similar repulsion effect is observed in edge-triggered systems, but since the cathode spots are created on the edge of the cathode the spots travel around the edges of the cathode, sometimes moving towards the centre. Though the spot motion appears macroscopically smooth, it is a result of individual spots extinguishing and new spots igniting at the edge of the crater created by the previous spot. The motion is therefore subject to discontinuities and jumps. FIGS. 2a and 2b illustrate cathode spot migration and cathode erosion profiles for an internal wire-triggered cathodic arc propulsion system with a centrally located trigger wire. FIG. 2b shows the trigger pin 210 and eroded material 220 on the surface of the cathode. FIGS. 3a and 3b illustrate cathode spot migration and cathode erosion profiles for an edge-triggered cathodic arc propulsion system. FIG. 3b shows eroded material 320 eroded from the surface of the cathode.

Since the plasma plume is directed normal to the local cathode surface, thrust is optimised by ensuring that the erosion profile is as flat as possible. An internal wire-triggered system has the advantage that the slope of the eroded zone can be adjusted by tuning the magnitude of the arc current as a function of the radial position of the spots during each pulse. The retrograde motion of cathode spots causes the cathode spots in edge-triggered systems to erode material preferentially from the edge of the cathode, leading to an undesirable convex erosion profile, which leads to a reduction of plasma transport parallel to the longitudinal axis of the system and hence loss of thrust after extended use. While the wear patterns created during the use of an internal wire-triggered cathodic arc result in lowered efficiency compared to a non-eroded cathode surface, the concave erosion results in a smaller drop in performance than a convex erosion profile, which can be mitigated by appropriate pulse shaping.

Figure 11:
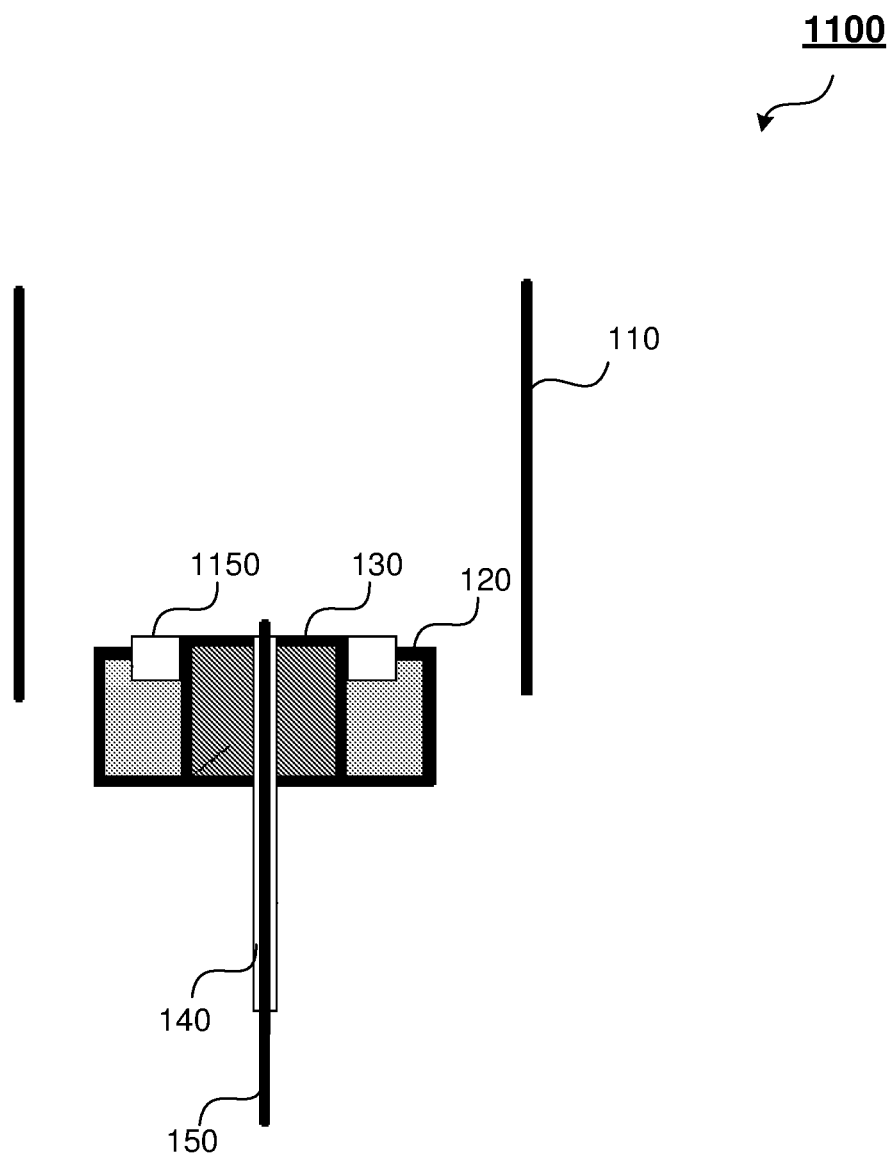
FIG. 11 is a schematic representation of an alternative arrangement of the internal wire-triggered pulsed cathodic arc propulsion system of FIG. 1.

FIG. 11 is a schematic representation of an alternative arrangement 1100 of the internal wire-triggered pulsed cathodic arc propulsion system of FIG. 1. The arrangement 1100 of FIG. 11 includes an insulator 1150 in the form of an annular Cathode Spot Inhibitor (CSI). The CSI ring 1150 acts to stop or inhibit the cathode spots from side-arcing or travelling from the cathode 130 onto the cathode mount 120 itself, thus increasing system efficiency and longevity. In one arrangement, the CSI 1150 is made out of a vacuum and thermally stable ceramic, such as alumina, tempered glass, boron nitride, or other suitable material. In one arrangement, the CSI ring 1150 is secured in place using suitable fasteners, such as bolts, threaded rod, or the like.

Figure 4A:
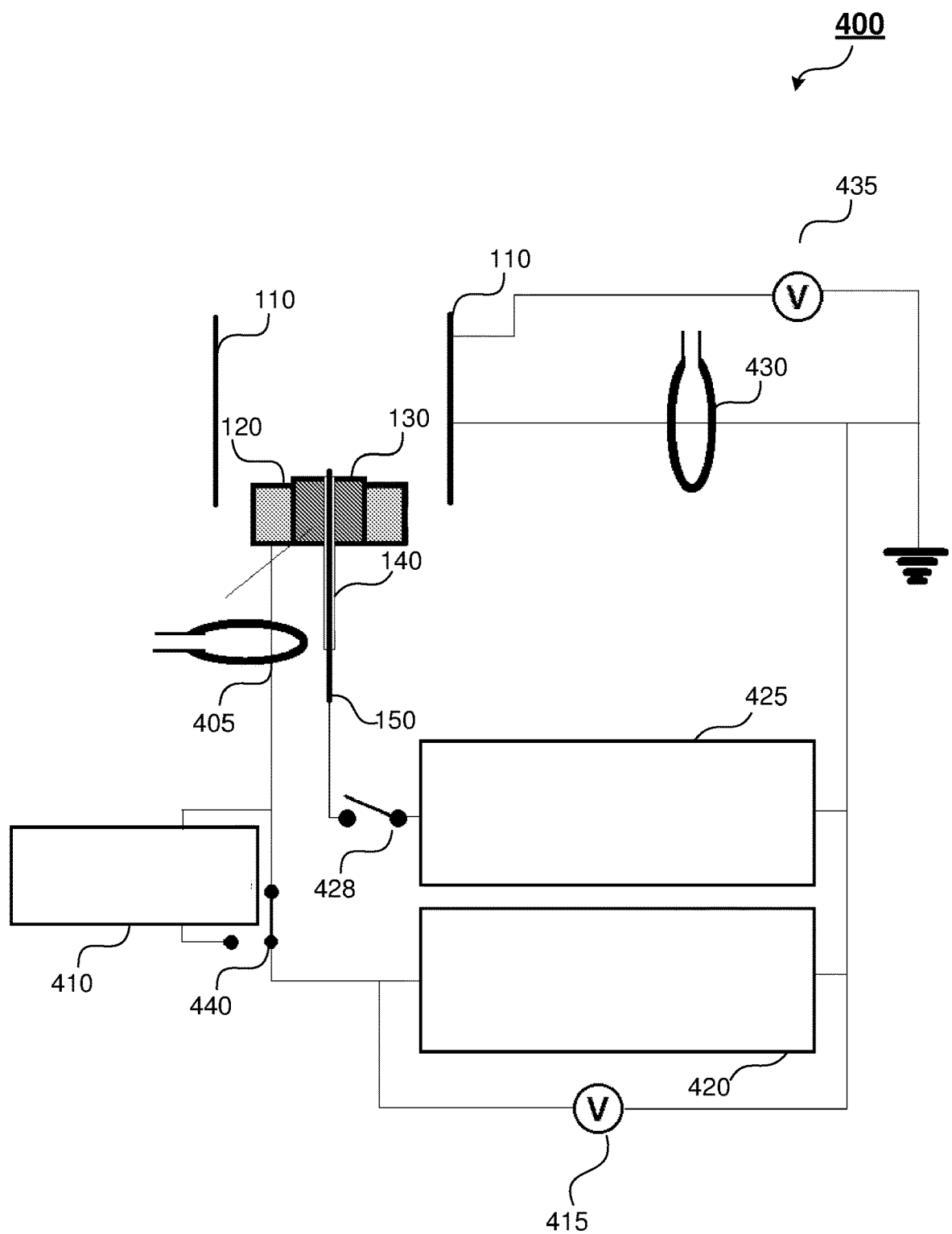
FIG. 4a is a schematic representation of a propulsion system embodying the internal wire-triggered pulsed cathodic arc propulsion system of FIG. 1.

FIG. 4a is a schematic representation of a propulsion system 400 embodying the internal wire-triggered pulsed cathodic arc propulsion system 100 of FIG. 1. The propulsion system 400 includes an anode voltage probe 435 connected to the anode 110. Connected in parallel to the anode voltage probe 435 is an anode current Rogowski coil 430 for measuring the current supplied to the anode 110. The propulsion system 400 also includes a cathode voltage probe 415 connected to the cathode mount 120 and a cathode current Rogowski coil 405 arranged to measure the current supplied to the cathode 130. The voltage probes 435, 415 and Rogowski coils 430, 405 are used to measure the plasma parameters.

The system 400 further includes a high voltage trigger supply 425, which in the example of FIG. 4a is rated at approximately 1200V. The high voltage trigger supply 425 is coupled to the trigger pin 150 via a trigger switch 428. Closing the trigger switch 428 has the effect of applying a high voltage trigger signal to the trigger pin 150, to generate electrical breakdown conditions over the face of the trigger insulator 140, as described above. In the example of FIG. 4a, the trigger signal is approximately 1.2 kV. The system 400 further includes a main capacitor bank 420 rated at 21 mF in the range from 0-450V. The main capacitor bank 420 can dissipate its stored energy through the cathode 130 over a period of less than 1 millisecond, thus supplying the high power required to activate the cathode spots.

Once the arc has been triggered, the arc forms a low-impedance short circuit between the cathode 130 and anode 110, through which the main capacitor bank 420 discharges. This means that the trigger circuit acts as a switch for the main capacitor bank 420, allowing current to flow through the cathode 130, then through the plasma to the anode 110 and the grounded walls before being earthed. The trigger circuit itself may be controlled using a computer program.

Various configurations of capacitors can supply current to the cathode as a pulse with either a square or a sawtooth profile. The erosion profile of the cathode 130 differs depending on the current profile. The main capacitor bank 420 ordinarily delivers a sawtooth pulse. In the example of FIG. 4a, a bank of fast-rising "speed-up" capacitors 410 mounted close to the cathode can be connected to the circuit via a switch 440 to alter the current profile to deliver a square pulse. In the example of FIG. 4a, the bank of speed-up capacitors 410 supplies an extra 1.5 mF to the total capacitance of the power supply.

Figure 4B:
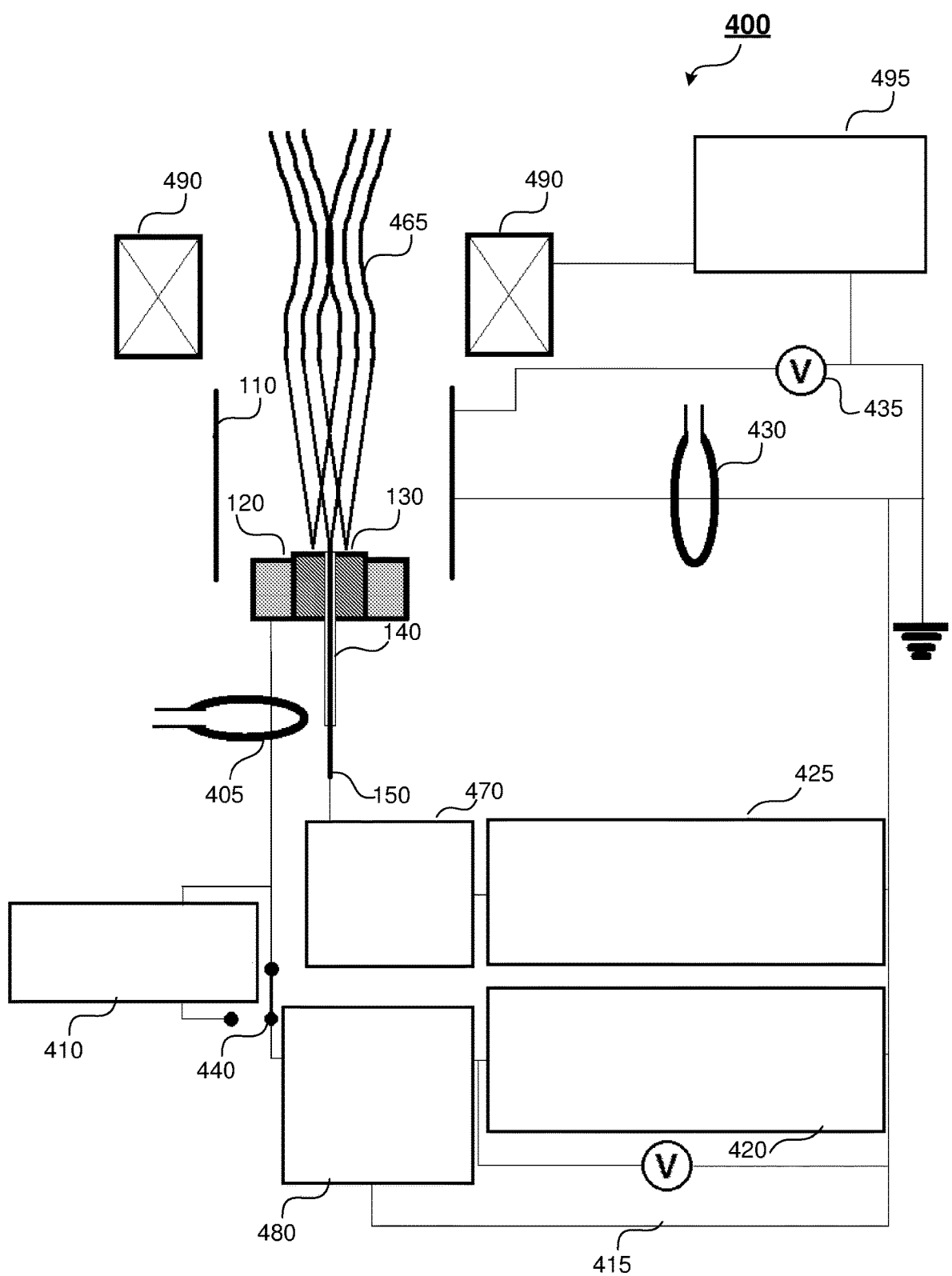

FIG. 4b is an illustration of an alternative arrangement of the propulsion system 400 of FIG. 4a. In the example of FIG. 4b, the propulsion system 400 includes a magnetic nozzle 490 and an associated magnetic coil power supply 495. The magnetic nozzle 490 can be used to direct a plasma plume 465 emitted from the cathode 130 by varying a magnetic field applied to an opening of the propulsion system 400.

The propulsion system 400 of FIG. 4b replaces the trigger switch 428 with a trigger control system 470. The trigger control system 470 may be implemented, for example, by using one or more switches and an associated controller to control actuation of those switches. In one arrangement, the trigger control system 470 includes a processor, a memory, and a computer program stored in the memory and adapted to be executed on the processor, whereby when executed the program provides an interface to a user to enable a user to select between an open and closed state of the switch(es), thereby to control application of a high voltage trigger signal from the high voltage trigger supply 425 to the trigger pin 150.

The propulsion system 400 of FIG. 4b further includes a pulse control and termination system 480, which controls grounding of the main capacitor bank 420 at the conclusion of a pulse to ensure a nominated pulse duration. In one arrangement, the pulse control and termination system 480 includes a processor, a memory, and a computer program stored in the memory and adapted to be executed on the processor, whereby when executed the program controls grounding of the main capacitor bank 420.

Figure 5A:
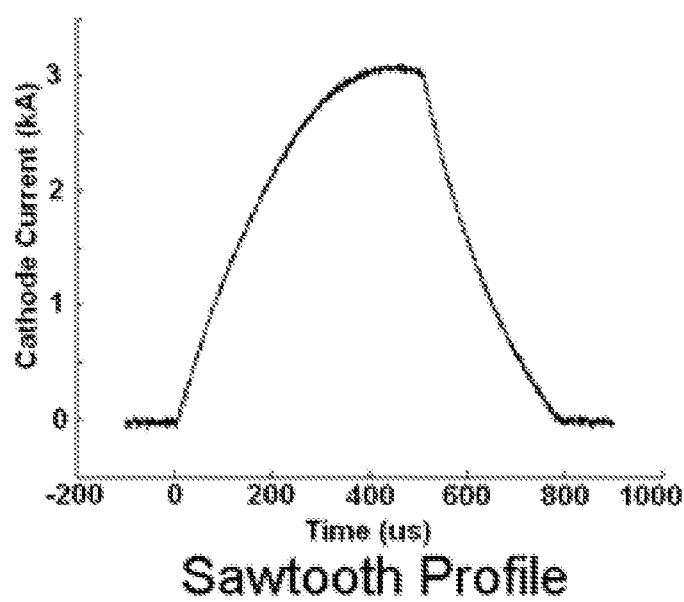
FIG. 5a is an illustration of a sawtooth current profile.
Figure 5B:
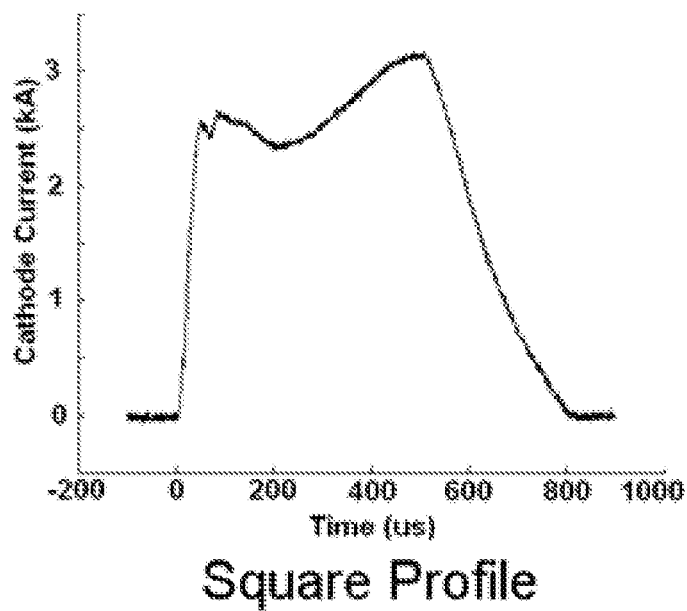
FIG. 5b is an illustration of a square current profile.

FIG. 5a is an illustration of a sawtooth current profile delivered by the main capacitor bank 420 and FIG. 5b is an illustration of a square current profile delivered by the main capacitor bank 420 in series with the bank of fast-rising speed-up capacitors 410.

The difference between the current through the cathode 130 and the current collected at the anode 110 is a measure of the plasma available to produce thrust. The difference between these two currents is termed the Net Ejected Current (NEC), which is a measure of how much plasma is flowing out of the anode 110 mouth.

A high NEC indicates that a large degree of plasma material is escaping, and thus generating thrust. Conversely, a low NEC indicates that most of the plasma material is travelling directly to the anode, impacting there and thus generating little net force. Integration of the NEC over the duration of the pulse determines the Net Ejected Charge (NEQ). NEQ correlates strongly with the impulse delivered by a PCA thruster, where impulse is a measure of the total change in momentum experienced by a spacecraft to which the PCA thruster is attached.

After the arc has been initiated, the cathode spots will migrate to the edge of the upper face of the cathode 130, due to the repulsive force between cathode spots. If the arc is not stopped when the cathode spots reach the edge of the cathode face, the cathode spots will move onto the side surfaces of the cathode 130. Since the plasma would then be projected normal to the cathode sides, the plasma would move straight to the wall of the anode 110, rather than exiting the anode mouth. This phenomenon is termed "side-arcing" and can result in major losses in efficiency.

Figure 6A:
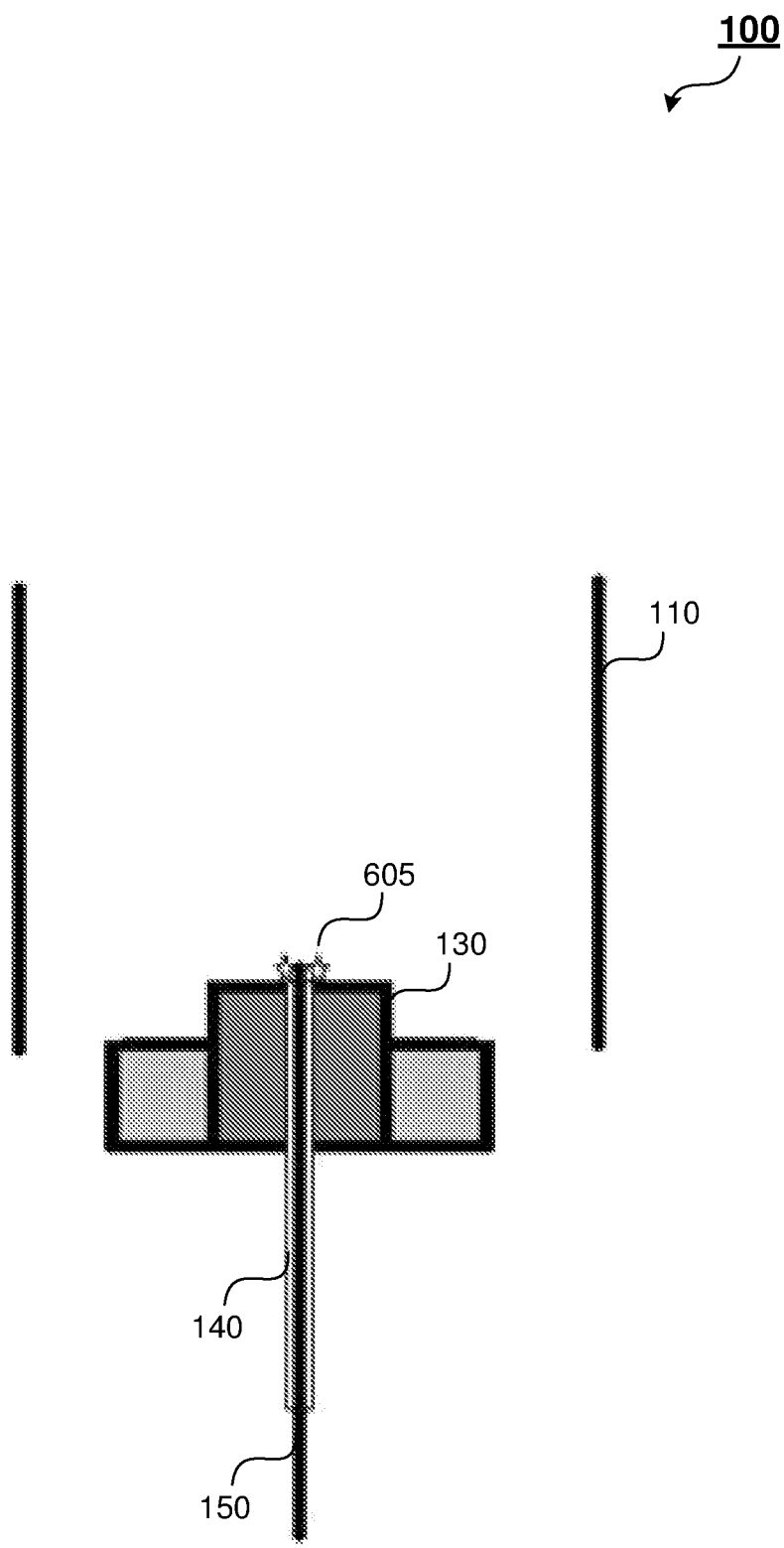
FIGS. 6a to 6d are schematic side-view representations of plasma generation using the internal wire-triggered pulsed cathodic arc propulsion system of FIG. 1.

FIGS. 6a to 6d are schematic side-view representations of plasma generation using the internal wire-triggered pulsed cathodic arc propulsion system of FIG. 1. In particular, FIGS. 6a to 6d illustrate the movement of cathode spots and evolution of the arc from triggering to side-arcing. FIG. 6a illustrates the system 100 of FIG. 1 at a point in time at which an arc 605 has been triggered by applying a high voltage of approximately 1200V to an upper end of the trigger pin 150. The high voltage is applied in a pulse to generate a flashover between the trigger pin 150 and the cathode 130. A potential difference in the range of 50-400V exists between the cathode 130 and the anode 110.

Figure 6B:
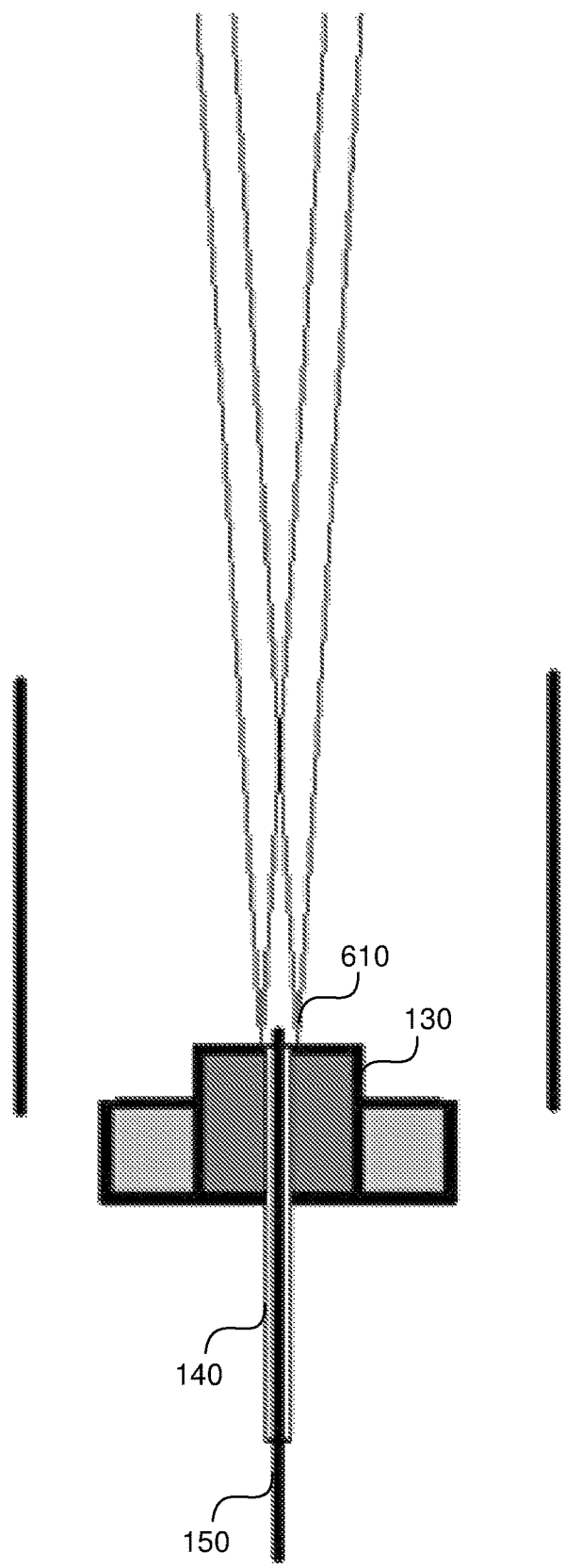
Figure 6C:
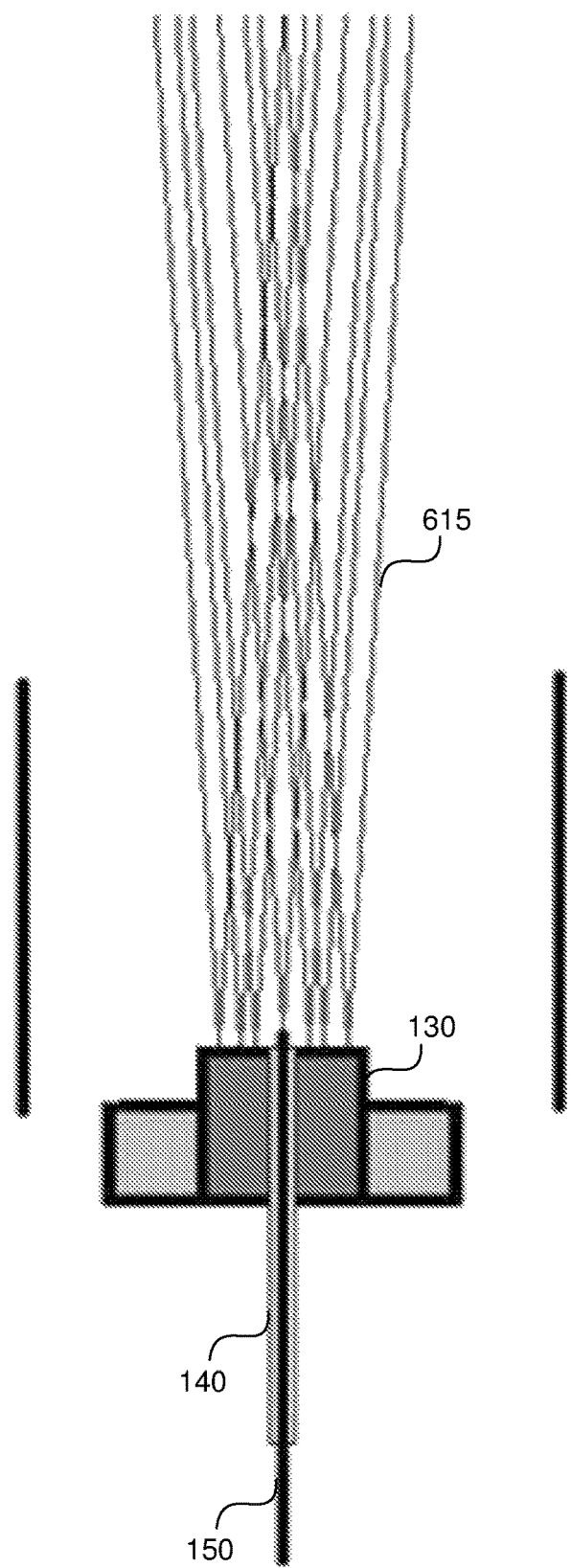
Figure 6D:
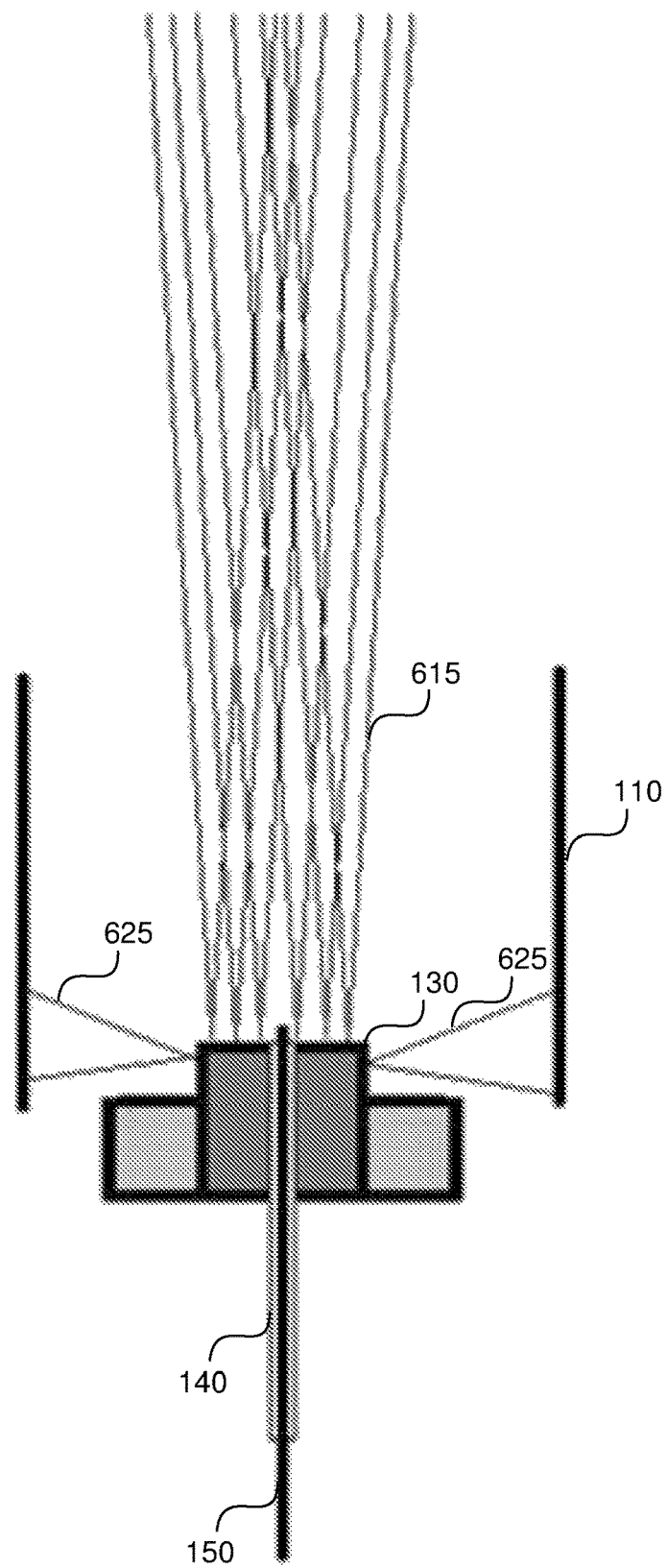

After the arc has been triggered and electron current between the cathode 130 and anode 110 is sustained, the creation of cathode spots 610 occurs close to the location of the trigger 150, as shown in FIG. 6b. These spots repel each other and are forced outwards as they erode cathode material to form the arc plasma 615, as shown in FIG. 6c. FIG. 6d illustrates side-arcing 625. If the arc is not halted by grounding the power supply at the correct time, then the cathode spots will continue to push each other outwards, causing the cathode spots to cross over the edge of the upper surface of the cathode 130 and commence eroding material from the side faces of the cathode 130 directly to the anode 110. Note that FIG. 6d is a side-view; all cathode spots are located near the edge of the cathode upper surface, only a few have moved to the side surface to begin side arcing, and those spots that appear to be producing plasma proximal to the trigger location have moved away from the viewer and into the page.

Any PCA thruster embodied in a spacecraft needs to operate for hours to effect any orbital transfer manoeuvre and to be able to commence operations after dormant periods of days to months in the case of orbital station-keeping or course correction manoeuvres. This requires that the arc be able to operate reliably for extended periods of time, with many thousands of pulses triggered reliably.

As the arc fires, it erodes material from the surface of the cathode, gradually wearing away the surface of the cathode and leading to difficulty in triggering the arc if there is too much distance between the trigger pin and the cathode. In one arrangement, the internal wire-triggered pulsed cathodic propulsion system includes a feed mechanism for advancing the eroding cathode to ensure optimal cathode firings. Such a feed mechanism periodically advances the cathode to ensure that the distance between the trigger pin and the cathode is not too great.

In one implementation, the feed mechanism includes a spring biased to advance the cathode relative to the trigger, as the cathode erodes. In another implementation, the feed mechanism includes mechanical actuators to advance the cathode relative to the trigger. Such a mechanical actuator may include, for example, a worm drive, wherein the worm drive includes a worm wheel adapted to engage a worm screw forming part of the cathode. A motor drives the worm wheel, which in turn engages the worm screw to advance the cathode in the desired direction. The worm screw may be integral with the cathode or be attached to an outer surface of the cathode.

Figure 12:
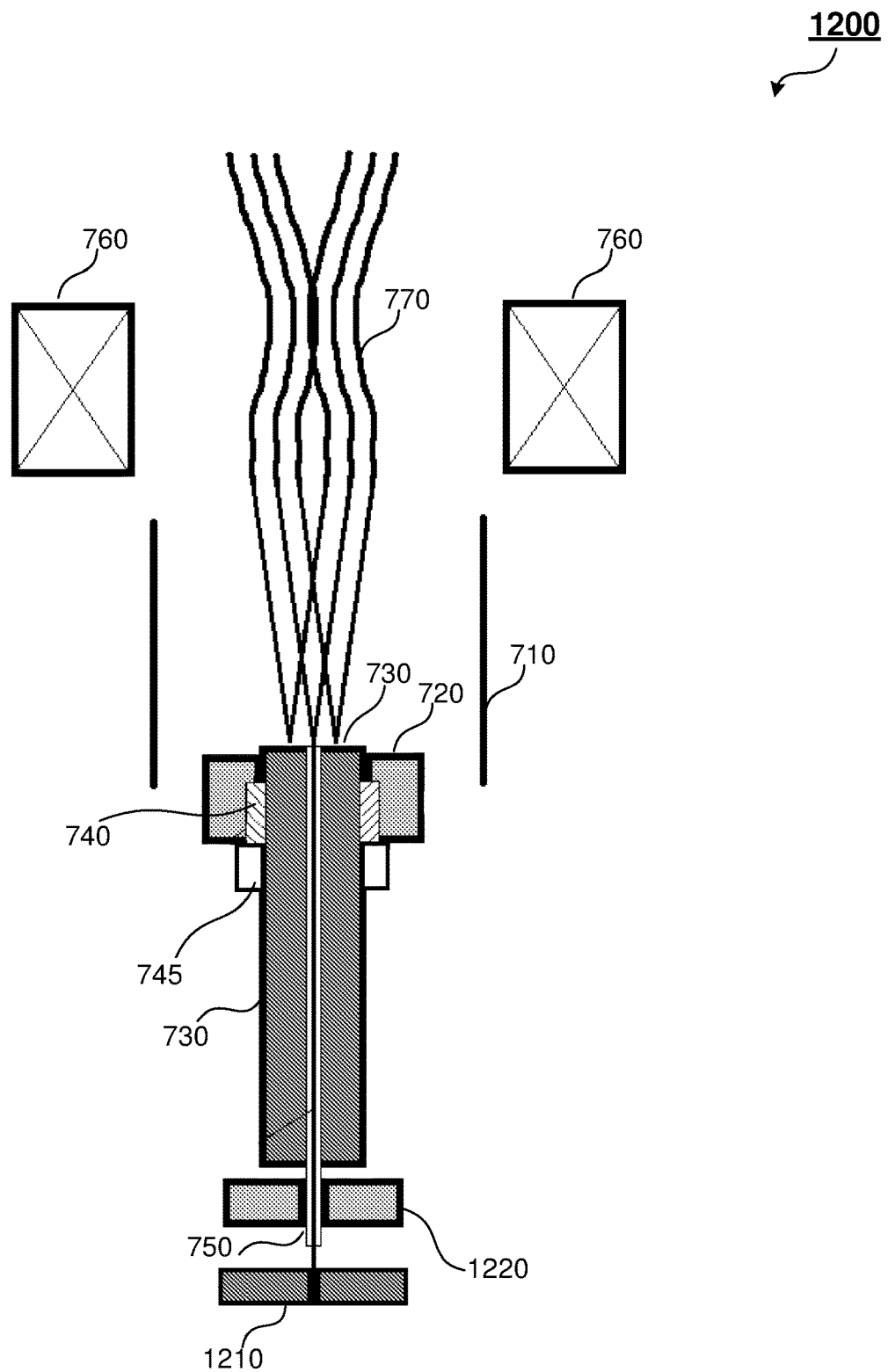
FIG. 12 is a schematic representation of the internal wire-triggered pulsed cathodic arc propulsion system of FIG. 7 with a cathode feed mechanism, a trigger feed mechanism, and a trigger insulator feed mechanism.

One arrangement of the internal wire-triggered pulsed cathodic arc propulsion system includes a trigger feed mechanism to advance the trigger insulator 140 and trigger pin 150. Over a period of time of use, it is possible that the wear rate of the trigger insulator 140 and trigger pin 150 differs from the wear rate of the cathode 130. The trigger insulator 140 and trigger pin 150 may also be sputtered by ions expelled from the cathode spots. FIG. 12 is a schematic representation of the internal wire-triggered pulsed cathodic arc propulsion system of FIG. 7 with the addition of a trigger feed mechanism 1210, and a trigger insulator feed mechanism 1220. The trigger feed mechanism 1210 and trigger insulator feed mechanism 1220 can be used to advance or withdraw the trigger insulator 140 and trigger pin 150 to ensure optimal operation. As for the feed mechanism described above in relation to the cathode, each of the trigger feed mechanism 1210 and trigger insulator feed mechanism 1220 may be implemented using a biased spring, mechanical actuator, such as a worm gear arrangement, or other suitable mechanism.

In order to derive maximum thrust from the plasma discharged from the cathode, it is advantageous to direct the plasma. The plasma expands in a cone normal to the cathode surface from each cathode spot, with the spatial plasma distribution being conical, with an approximately cosinusoidal angular distribution. That is, the plasma is primarily ejected normal to the plane of the cathode surface, with smaller quantities being ejected at angles further from the normal direction. One arrangement applies a magnetic field to focus the plasma, so that a higher proportion of the plasma plume is normally directed and thus enhance the thrust.

One implementation uses permanent magnets to direct the plasma plume. Another implementation uses the discharge current to generate a magnetic field to direct the plasma plume. In this implementation, either the cathode current or anode current, or both the cathode and anode currents, are run through field coils located downstream of the cathode face. Another implementation has a dedicated power supply, such as a separate capacitor bank, to deliver current to the field coils. All implementations provide improved thrust with minimal or no additional power consumption and a small increment in mass.

Figure 7:
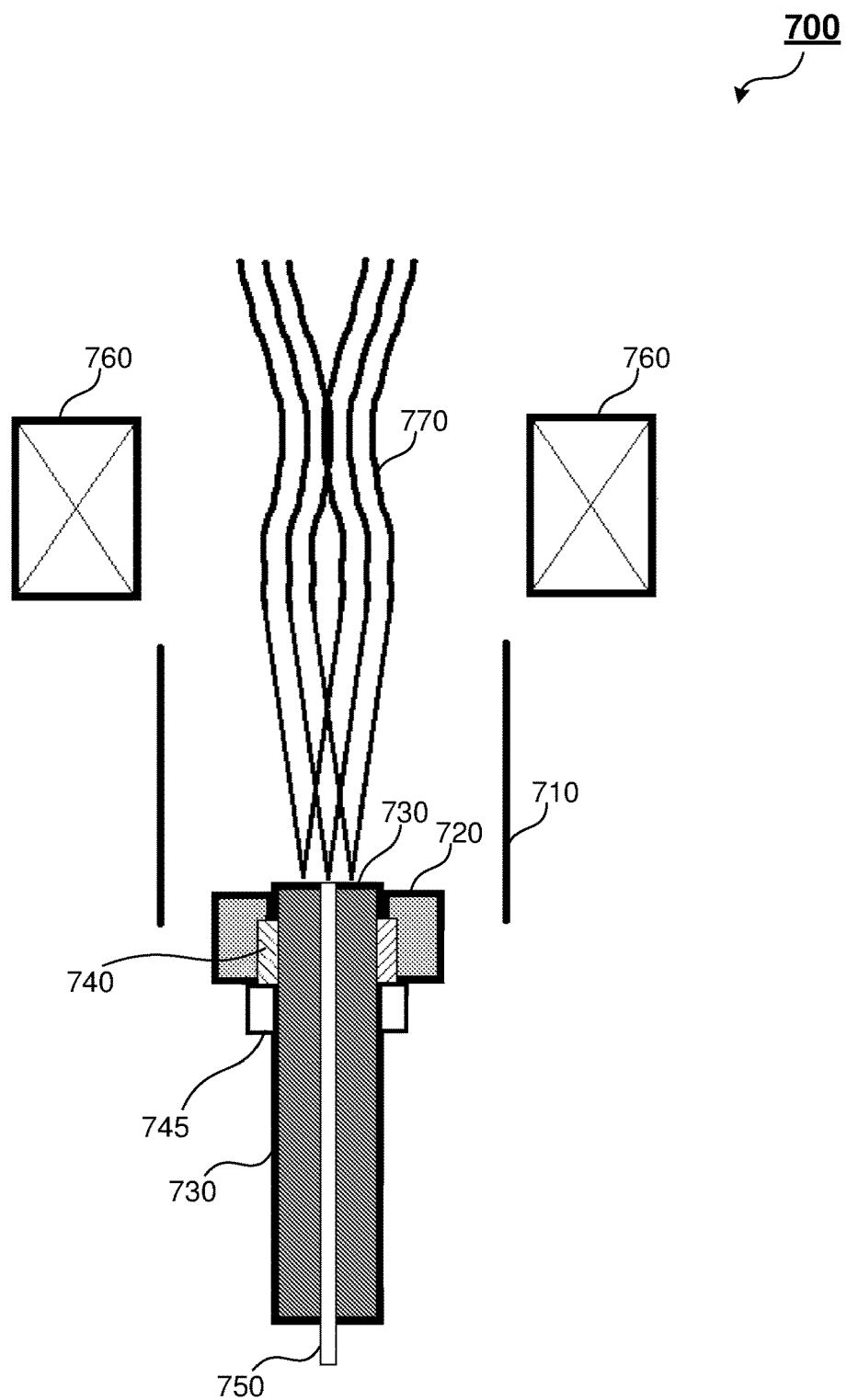
FIG. 7 is a schematic representation of an internal wire-triggered pulsed cathodic arc propulsion system with a magnetized nozzle and a cathode feed mechanism.

FIG. 7 is a schematic representation of an internal wire-triggered pulsed cathodic arc propulsion system 700 with a magnetized nozzle 760 and a cathode feed mechanism. This magnetic nozzle may be placed before, surrounding, or after the cathode front face, so that the magnetic field lines from the nozzle are converging, parallel or diverging, according to the specific needs of the fuel and charge combination. The propulsion system 700 includes a cathode 730 attached to a cathode mount 720 and an anode 710. A potential difference is applied between the cathode 730 and the anode 710.

The propulsion system 700 also includes a centrally located electrical trigger system that includes a trigger pin and associated insulator 750. As described with reference to FIGS. 4a and 4b and FIGS. 6a to 6d, a high voltage applied to the trigger causes an arc discharge on an upper surface of the cathode 730. The resultant plasma plume 770 is generally conically shaped and is emitted normally to the upper surface of the cathode 730. The magnetized nozzle 760 is implemented using one or more magnets, such as permanent magnets, or magnetic coils. Placing the magnetized nozzle 760 at the mouth of the anode 110 directs the plasma plume 770 to improve the thrust of the propulsion system 700.

The cathode feed mechanism is implemented using a worm gear 740 driven by a cathode advancing motor 745. In this arrangement, the worm gear 740 is adapted to engage with a worm thread cut into an outer surface of the cathode 730. The worm gear 740 may be implemented by cutting a thread into the cathode mount 720, the threads on the cathode 730 and the cathode mount 720 being the same so as to engage with one another. The motor is coupled to a control system to advance the cathode 730 at a predefined rate, based on the erosion, or expected erosion, of the upper surface of the cathode 730. The actual dimensions of the cathode 730 will depend on the particular combination of charge voltage, duration, and the material being used. In one arrangement, a cathode made from magnesium and suitable for a long-duration space mission is at least 500 mm long and has a diameter in the range of 10 mm to 100 mm.

A further advantage relating to the internal wire-triggered pulsed cathodic propulsion system of the present disclosure relates to the net negative charge of the plasma exhaust plume. A pulsed arc will therefore not require charge neutralisation systems, such as are needed for Hall Effect thrusters or gridded ion thrusters.

A further arrangement includes a steering device to steer cathode spots across the surface of the cathode. Such a steering device may be implemented, for example, by switching more capacitors into the discharge at the correct times, which minimises the deposition of eroded material onto the ridges left on the cathode surface by the erosive processes of arc operation. Another implementation of a steering mechanism may be as a side-effect of using a magnetic nozzle, as the imposed magnetic field causes the cathode spots to move in a spiral pattern due to the retrograde J×B effect.

Figure 10:
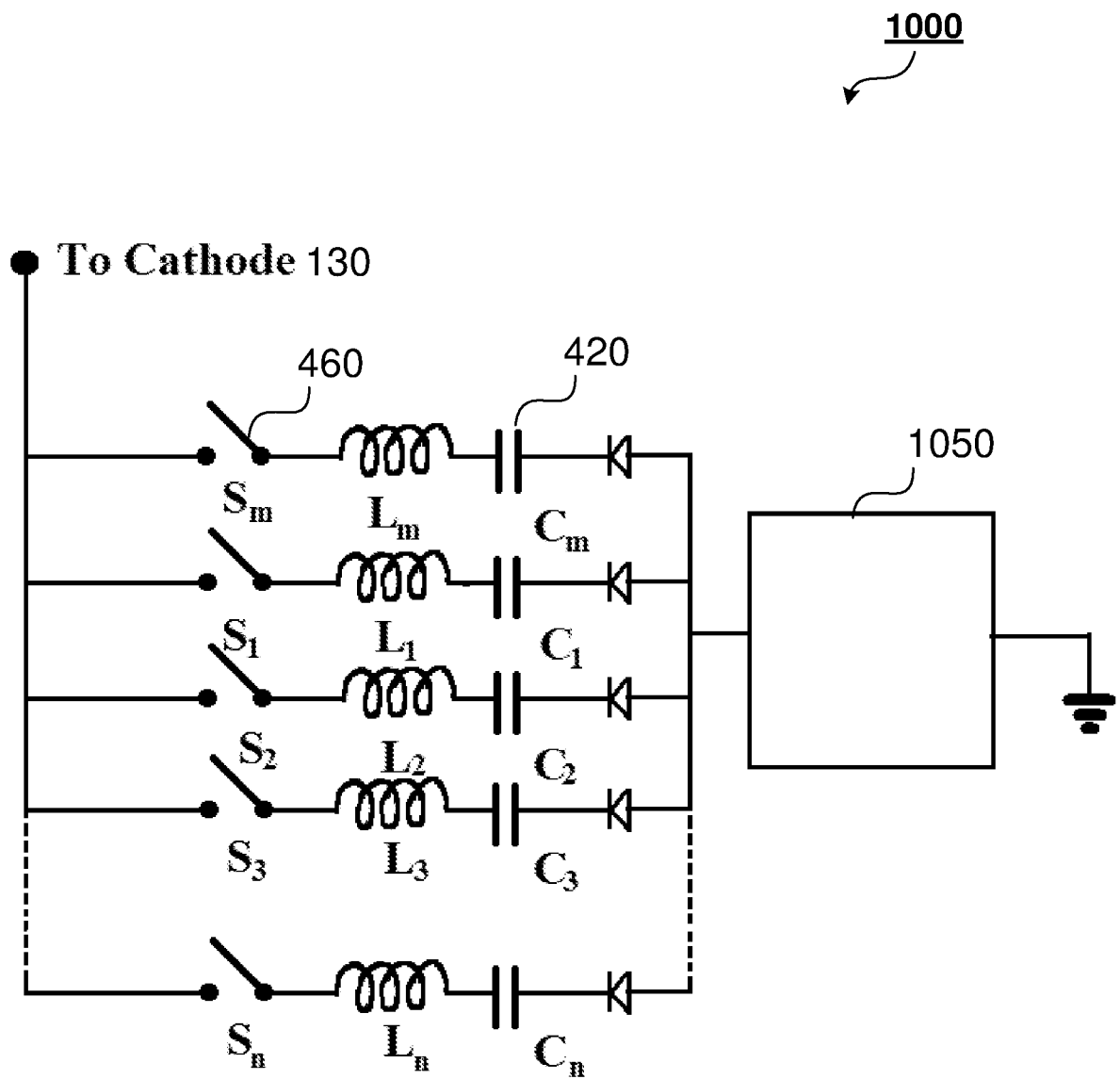
FIG. 10 illustrates a circuit diagram showing a set of sub-banks of capacitors.

FIG. 10 illustrates a sample circuit diagram 1000 showing a capacitor charging power supply 1050 supplying power to a set of sub-banks of capacitors $C_1, \ldots, C_n$ in parallel with a main capacitor bank $C_m$, corresponding to the main capacitor bank 420 of FIG. 4a. The main capacitor bank $C_m$ is in series with an inductor $L_m$ and a switch $S_m$. Each of the sub-banks of capacitors $C_1, \ldots, C_n$ is arranged in a similar configuration, with capacitor $C_1$ in series with an inductor $L_1$ and a switch $S_1$, and so on through to capacitor $C_n$ being in series with an inductor $L_n$ and a switch $S_n$. Each parallel arm of the circuit 1000 includes a diode to ensure unidirectional current flow through the circuit 1000.

In the example of FIG. 10, each of the sub-banks of capacitors $C_1, \ldots, C_n$ is charged to the same voltage as the main capacitor bank $C_m$. The switch $S_m$ corresponds to the trigger switch 460 of FIG. 4b. When the switch $S_m$ is closed, corresponding to the trigger switch being closed, the main capacitor bank $C_m$ discharges current through the inductor $L_m$ and into the cathode 130 to power the plasma arc. After a short, predefined time interval, such as a few tens to hundreds of microseconds, switch $S_1$ is closed, allowing current to flow from the sub-bank capacitor $C_1$ through the inductor $L_1$ to the cathode 130. The inductor $L_1$ is present to ensure that the rise time of sub-bank $C_1$ is sufficiently small. Increasing the flow of current to the anode 130 increases the number of cathode spots that form on the surface of the cathode 130. Increasing the number of cathode spots ensures that fewer surface ridges are formed on the upper surface of the cathode 130.

After a further predefined time interval, switch $S_2$ is closed, allowing current to flow from the sub-bank capacitor $C_2$ through the inductor $L_2$ to the cathode 130. This process is repeated for each of the switches $S_3, \ldots, S_n$, in turn. In one arrangement, the pulse control and termination system 480 of FIG. 4b controls operation of the switches $S_1, \ldots, S_n$.

Figure 8:
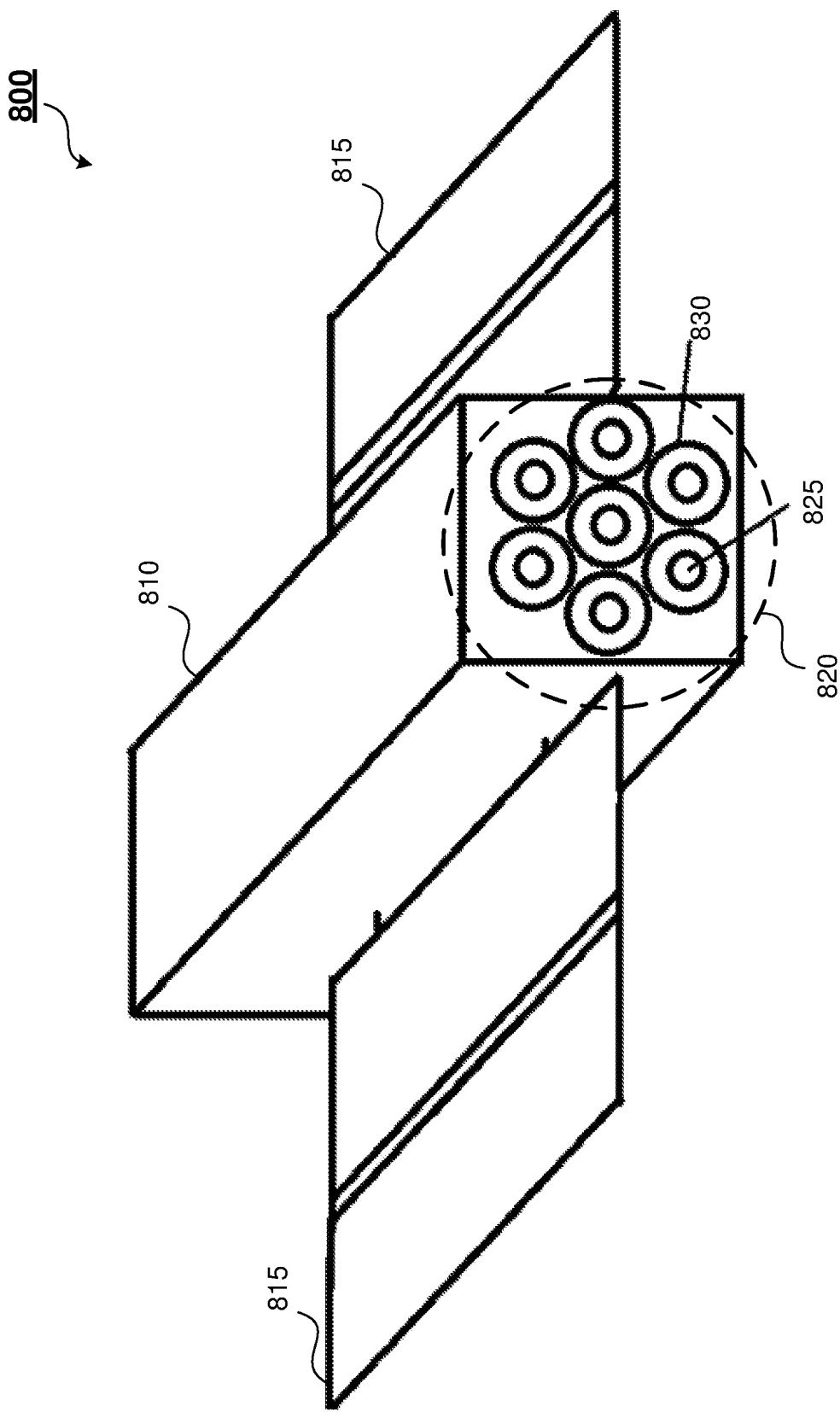
FIG. 8 is a schematic representation of a spacecraft having a plurality of thrusters arranged in a thruster pod.

FIG. 8 is a schematic representation of a spacecraft 800 having a plurality of thrusters arranged in a thruster pod 820. In the example of FIG. 8, the spacecraft 800 is a satellite having a body portion 810, solar panel arrays 815, and the thruster pod 820. In this example, the thruster pod 820 includes seven thrusters, wherein each thruster uses a PCA propulsion system of the type described herein. Each thruster includes a cathode-anode PCA propulsion system 825 and a magnetic nozzle 830. The magnetic nozzle 830 can be used to control the direction of a plasma plume ejected from the respective thruster. It will be appreciated that the number of thrusters in the thruster pod 820 and the arrangement of those thrusters will depend on the particular application, including the size of the spacecraft.

The thruster pod 820 is used for orbital station-keeping, whereby one or more of the thrusters in the thruster pod 820 is activated as a thruster burn to place or keep the satellite 800 in an assigned orbit. Such thruster burns may be used, for example, to compensate for the gravitational forces from the Earth, the Sun, and the Moon, and atmospheric drag.

Figure 9:
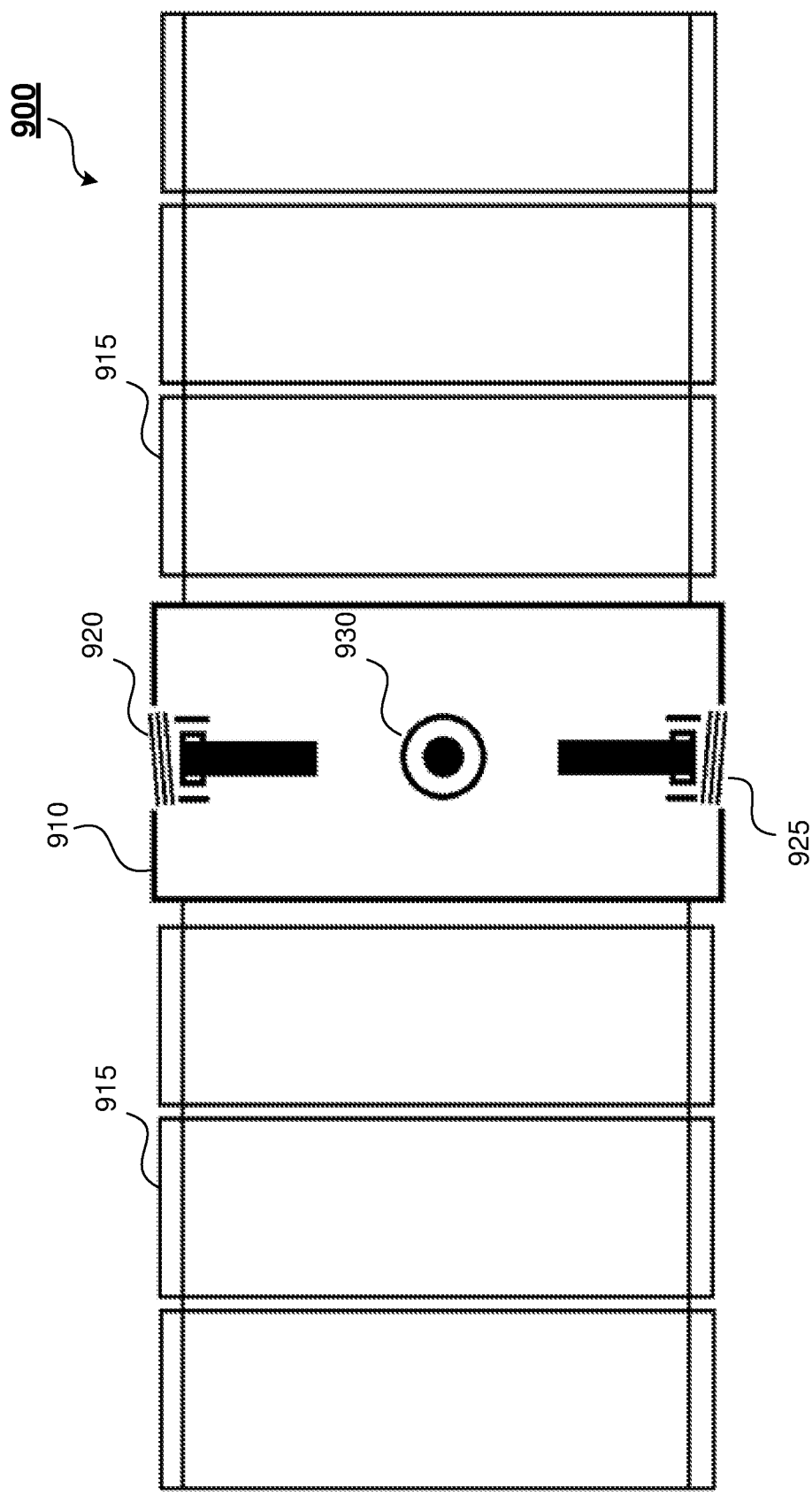
FIG. 9 is a schematic representation of a spacecraft having multiple thrusters.

FIG. 9 is a schematic representation of a spacecraft 900 having multiple PCA propulsion system thrusters. In the example of FIG. 9, the spacecraft 900 is a communications satellite 900 having a main body portion 910 and solar panel arrays 915. The satellite 900 also includes first and second thrusters 920, 925 longitudinally opposed at opposite ends of the body 910 of the satellite 900. The first and second thrusters 920, 925 are used for station keeping of the satellite 900 in a North/South direction. The satellite 900 also includes a third thruster 930 and a fourth thruster (not shown), which are transversely opposed about a middle portion of the body 910. The third thruster 930 and fourth thruster are used for station keeping of the satellite 900 in an East/West direction.

INDUSTRIAL APPLICABILITY

The arrangements described are applicable to the space industries.

The foregoing describes only some embodiments of the present invention, and modifications and/or changes can be made thereto without departing from the scope and spirit of the invention, the embodiments being illustrative and not restrictive.

In the context of this specification, the word "comprising" and its associated grammatical constructions mean "including principally but not necessarily solely" or "having" or "including", and not "consisting only of". Variations of the word "comprising", such as "comprise" and "comprises" have correspondingly varied meanings.

As used throughout this specification, unless otherwise specified, the use of ordinal adjectives "first", "second", "third", "fourth", etc., to describe common or related objects, indicates that reference is being made to different instances of those common or related objects, and is not intended to imply that the objects so described must be provided or positioned in a given order or sequence, either temporally, spatially, in ranking, or in any other manner.

Although the invention has been described with reference to specific examples, it will be appreciated by those skilled in the art that the invention may be embodied in many other forms.

The invention claimed is:

1. A pulsed cathodic arc propulsion system for use in a spacecraft comprising:

a cathode, wherein said cathode is solid and is conductive or semi-conductive;

an anode having a potential difference relative to said cathode, said potential difference creating an electric field between said anode and said cathode; and an insulated electrical trigger comprising a trigger pin and an insulator between said trigger pin and said cathode, said insulated electrical trigger adapted to trigger an arc discharge from a point on an outer surface of said cathode when said insulated electrical trigger and said cathode are in a vacuum or a near vacuum space environment, said insulated electrical trigger being bounded within the cathode so that the point at which the arc discharge is triggered is located on the outer surface of said cathode, said anode and said cathode being arranged so that the arc discharge propels the spacecraft, wherein the insulated electrical trigger comprises a trigger power supply configured to operate in the vacuum or the near vacuum space environment and to apply a charging voltage in the range of 50V to 500V between the cathode and the anode and to generate a trigger pulse of 1.2 kV or less with a first duration of 3 microseconds or less to create a high current surface flashover across said insulator between the trigger pin and the outer surface of the cathode to create a plasma, and the trigger power supply is further configured to maintain the production of the plasma by applying a burning voltage of between 30V and 100V between the cathode and the anode for a second duration of between 20 microseconds to 500 microseconds after the trigger pulse.

2. The pulsed cathodic arc propulsion system according to claim 1, wherein the cathode is selected from the group consisting of: magnesium, titanium, carbon, aluminium, calcium, carbon, vanadium, molybdenum, tungsten, tantalum, tin, bismuth, nickel, iron and chromium.

3. The pulsed cathodic arc propulsion system according to claim 1, wherein the cathode is an alloy or composite comprising at least one of magnesium, titanium, carbon, aluminium, calcium, carbon, vanadium, molybdenum, tungsten, tantalum, tin, bismuth, nickel, iron or chromium.

4. The pulsed cathodic arc propulsion system according to claim 1, wherein the insulated electrical trigger is a wire which protrudes from the cathode at a trigger point on the outer surface of the cathode, and further wherein the insulated electrical trigger is internal to the cathode.

5. The pulsed cathodic arc propulsion system according to claim 1, wherein the insulated electrical trigger is located at a trigger point on the outer surface of the cathode, said trigger point being within a perimeter of said outer surface.

6. The pulsed cathodic arc propulsion system according to claim 5, wherein said trigger point is located at or adjacent to a centre of the outer face of the cathode.

7. The pulsed cathodic arc propulsion system according to claim 6, wherein said trigger point is located on or proximal to an edge of a centre-bored hole of said cathode, wherein at least part of said insulated electrical trigger is located within said centre-bored hole.

8. The pulsed cathodic arc propulsion system according to claim 5, wherein the trigger point is located less than one half of a distance from a centre of the outer surface of the cathode to a circumference of the outer surface of the cathode.

9. The pulsed cathodic arc propulsion system according to claim 8, wherein the trigger point is located less than one quarter of the distance from the centre of the outer surface of the cathode to the circumference of the outer surface of the cathode.

10. The pulsed cathodic arc propulsion system according to claim 1, wherein said trigger pin comprises a refractory metal.

11. The pulsed cathodic arc propulsion system according to claim 10, wherein said refractory metal is tungsten.

12. The pulsed cathodic arc propulsion system according to claim 1, wherein said plasma forms a plasma plume normal to the outer surface of the cathode.

13. The pulsed cathodic arc propulsion system according to claim 1, further comprising:
a feed mechanism to control movement of said cathode relative to said insulated electrical trigger.

14. The pulsed cathodic arc propulsion system according to claim 13, wherein said feed mechanism includes a worm drive, said worm drive including a worm wheel adapted to engage a worm screw forming part of said cathode, said worm wheel being driven by a motor.

15. The pulsed cathodic arc propulsion system according to claim 13, wherein said feed mechanism includes a spring biased to advance the cathode, relative to said insulated electrical trigger, as said cathode wears from said arc discharge.

16. The pulsed cathodic arc propulsion system according to claim 12, further comprising: a magnetic nozzle for directing said plasma plume.

17. The pulsed cathodic arc propulsion system according to claim 16, wherein said magnetic nozzle includes at least one permanent magnet.

18. The pulsed cathodic arc propulsion system according to claim 1, further comprising:
a magnetic guide adapted to steer the point of the arc discharge on the outer surface of said cathode.

19. The pulsed cathodic arc propulsion system according to claim 18, wherein said magnetic guide includes at least one of a magnetic coil or a permanent magnet.

20. A spacecraft propulsion system comprising the pulsed cathodic arc propulsion system of claim 1.

21. A spacecraft comprising the spacecraft propulsion system of claim 1, wherein the spacecraft is selected from the group consisting of: rockets, space shuttles, satellites, and space stations.

22. The pulsed cathodic arc propulsion system according to claim 1, further comprising a main capacitor bank ($C_m$) configured to dissipate stored energy through the cathode to maintain production of the plasma after triggering.

23. The propulsion system according to claim 22 wherein the insulated electrical trigger further comprises a pulse control and termination system which controls grounding of the main capacitor bank to terminate the trigger pulse a predetermined time period after triggering.

24. The pulsed cathodic arc propulsion system according to claim 23, wherein the pulse control and termination system uses pulse shaping to change a magnitude of a current of the arc discharge to control an erosion profile of the cathode.

25. The pulsed cathodic arc propulsion system according to claim 24 further comprising a steering device to steer cathode spots across the upper surface of the cathode, the steering device comprising the main capacitor bank $C_m$ in series with an inductor $L_m$ and a switch $S_m$, wherein the main capacitor bank is in parallel with a set of sub-banks of capacitors where each capacitor of the set of sub-banks of capacitors is in series with a respective inductor and a respective switch, and the pulse control and termination system controls operations of each switch.

* * * * *